US012741393B2

(12) United States Patent
Van Laar

(10) Patent No.: US 12,741,393 B2
(45) Date of Patent: Sep. 22, 2026

(54) APPLICATOR UNIT, TIRE BUILDING DEVICE AND METHOD FOR APPLYING A STRIP TO A DRUM

(71) Applicant: VMI HOLLAND B.V., Epe (NL)

(72) Inventor: Gerardus Johannes Catharina Van Laar, Epe (NL)

(73) Assignee: VMI HOLLAND B.V., Epe (NL)

( * ) Notice: Subject to any disclaimer, the term of this patent is extended or adjusted under 35 U.S.C. 154(b) by 372 days.

(21) Appl. No.: 18/546,630

(22) PCT Filed: Feb. 3, 2022

(86) PCT No.: PCT/NL2022/050051
§ 371 (c)(1),
(2) Date: Aug. 16, 2023

(87) PCT Pub. No.: WO2022/177421
PCT Pub. Date: Aug. 25, 2022

(65) Prior Publication Data

US 2024/0131742 A1 Apr. 25, 2024
US 2024/0227229 A9 Jul. 11, 2024

(30) Foreign Application Priority Data

Feb. 16, 2021 (NL) ...................................... 2027569

(51) Int. Cl.
*B26D 3/11* (2006.01)
*B26D 1/157* (2006.01)
(Continued)

(52) U.S. Cl.
CPC .............. *B26D 3/11* (2013.01); *B26D 1/1575* (2013.01); *B26D 7/018* (2013.01); *B26D 7/088* (2013.01);
(Continued)

(58) Field of Classification Search
CPC ..... B26D 3/11; B29D 30/242; B29D 30/3007
(Continued)

(56) References Cited

U.S. PATENT DOCUMENTS 1,938,787 A * 12/1933 Abbott, Jr. ............. B29D 30/46 83/648
3,732,767 A * 5/1973 Habert ................... B29D 30/46 83/555
(Continued)

FOREIGN PATENT DOCUMENTS

CA 1125163 A 6/1982
CN 1411979 A 4/2003
(Continued)

OTHER PUBLICATIONS

Daumas, F. et al., "English machine-translation by Clarivate Analytics of WO2020099788A1 with full WO patent application included", B29D30/16, Nov. 14, 2019. (Year: 2019).*
(Continued)

*Primary Examiner* — Abbas Rashid
*Assistant Examiner* — Gregory C. Grosso
(74) *Attorney, Agent, or Firm* — Workman Nydegger

(57) ABSTRACT

The invention relates to an applicator unit, a tire building device and a method for applying a strip to a drum, wherein the applicator unit comprises an applicator roller and a cutter, wherein the applicator roller comprises a roller body that is rotatable about a roller axis for applying the strip to the drum in an application direction perpendicular to said roller axis, wherein the applicator roller and the cutter are configured to cooperate for cutting the strip on the applicator roller along a helical cutting path about the roller axis.

32 Claims, 7 Drawing Sheets

(51) Int. Cl.

| | |
|---|---|
| ***B26D 7/01*** | (2006.01) |
| ***B26D 7/08*** | (2006.01) |
| ***B26D 7/20*** | (2006.01) |
| ***B26D 7/26*** | (2006.01) |
| ***B29D 30/24*** | (2006.01) |
| ***B29D 30/28*** | (2006.01) |
| ***B29D 30/30*** | (2006.01) |

(52) U.S. Cl.
CPC ........... *B26D 7/204* (2013.01); *B26D 7/2635* (2013.01); *B29D 30/242* (2013.01); *B29D 30/28* (2013.01); *B29D 30/3007* (2013.01); *B29D 30/3028* (2013.01); *B29D 2030/3078* (2013.01)

(58) Field of Classification Search
USPC .......................................................... 156/250
See application file for complete search history.

(56) References Cited

U.S. PATENT DOCUMENTS

| | | | |
|---|---|---|---|
| 4,247,349 | A | 1/1981 | Detert et al. |
| 6,790,301 | B2 | 9/2004 | Risser et al. |
| 9,003,935 | B2 | 4/2015 | Herlinger et al. |
| 2011/0023671 | A1 | 2/2011 | Herlinger et al. |
| 2018/0236679 | A1 | 8/2018 | Strandh |
| 2019/0270266 | A1 | 9/2019 | Schouten et al. |
| 2024/0131742 | A1 | 4/2024 | Van Laar |

FOREIGN PATENT DOCUMENTS

| | | | | |
|---|---|---|---|---|
| CN | 218430103 | U | 2/2023 | |
| DE | 2257267 | A1 | 5/1973 | |
| EP | 0482830 | A2 | 10/1991 | |
| EP | 2279954 | A2 | 2/2011 | |
| EP | 3366437 | A1 * | 8/2018 | ............... B26D 3/10 |
| JP | H054293 | A | 1/1993 | |
| JP | 2003276715 | A | 10/2003 | |
| JP | 2018149680 | A | 9/2018 | |
| WO | 8100691 | A1 | 3/1981 | |

OTHER PUBLICATIONS

International Search Report from corresponding PCT Application No. PCT/NL2022/050051, Mar. 14, 2022.
Japanese Office Action from corresponding JP Application No. 2022-520231, Jun. 30, 2023.
Dutch Search Report from corresponding NL Application No. 2027569, Oct. 29, 2021.
Chinese Office Action from Corresponding Chinese Patent Application No. CN202210142946.6, Feb. 11, 2026.

* cited by examiner 1
2
5
50
31
32
R
LE
33
9
10
3
7
8
A
D 1
2
5
50
31
32
R
LE
33
9
10
3
7
8
D 1
2
5
50
31
32
R
Z
LE
33
9
10
3
7
8
A
D 1
2
5
50
31
32
R
33
9
10
V
3
7
8
D
LE

APPLICATOR UNIT, TIRE BUILDING DEVICE AND METHOD FOR APPLYING A STRIP TO A DRUM

BACKGROUND

The invention relates to an applicator unit, a tire building device and a method for applying a strip to a drum, in particular a strip-winding drum.

WO 81/00691 A1 discloses a tape-applying apparatus for automatically tacking, applying, stitching and then severing a tape used to wind toroidal bodies, such as tires and the like, on a drum. The apparatus comprises an applicator roller and a braking member that prevents further rotation of the applicator roller. The drum is controlled to rotate over a small amount to stretch the tape between the stitching rollers and the applicator roller until the tape severs with one free end of the tape draping over the applicator roller, ready for the next application to the drum and with the other free end of the tape being stitched to the drum by the stitching rollers.

SUMMARY OF THE INVENTION

A disadvantage of the known tape-applying apparatus is that the behavior of the tape during the severing is unpredictable and may result in a non-uniform leading end and trailing end. The stretching may also locally weaken the material of the tape, which makes it difficult to accurately apply the draping free end to the drum during the next application cycle.

It is an object of the present invention to provide an applicator unit, a tire building device and a method for applying a tire component to a drum, in particular a strip-winding drum, wherein at least one of the aforementioned drawbacks can be addressed.

According to a first aspect, the invention provides an applicator unit for applying a strip to a drum, wherein the applicator unit comprises an applicator roller and a cutter, wherein the applicator roller comprises a roller body that is rotatable about a roller axis for applying the strip to the drum in an application direction perpendicular to said roller axis, wherein the applicator roller and the cutter are configured to cooperate for cutting the strip on the applicator roller along a helical cutting path about the roller axis.

By cutting the strip directly on the applicator roller instead of severing the strip by stretching, the characteristics of the leading end and the trailing end, in particular the shape thereof, can be controlled more accurately. For example, the applicator roller may continue to rotate at a substantially constant angular velocity during the cutting, thereby preventing stretching or other excessive deformations of said leading end and trailing end. In other words, the strip can be cut while in motion or 'on-the-fly'. Alternatively, the angular velocity may fluctuate and/or be varied if so required by the process.

Preferably, the applicator roller comprises a plurality of retaining elements distributed over said roller body. The retaining elements can retain the strip to the roller body during the cutting and/or applying of the strip to the drum.

More preferably, the plurality of retaining elements are distributed over said roller body according to a pattern. The pattern may for example be adapted to best retain the contour of shape of the strip at the leading end.

More preferably, the pattern comprises a plurality of rows extending parallel to the roller axis and mutually spaced apart in a circumferential direction about said roller axis.

Each row of retaining elements can retain the strip, while the strip is not directly retained between said rows.

Most preferably, the helical cutting path extends through two or more rows of the plurality of rows while extending clear of the plurality of retaining elements in said two or more rows. The retaining elements may interfere with the cutting of the strip. In particular, when the retaining elements are recessed into the roller body or protrude from said roller body, the cutting blade may be unable to cut fully through the strip, i.e. because a part of the strip is pressed into an area inside or surrounding the retaining elements that is unreachable by the cutting blade. Hence, the cutting blade is made to follow the helical cutting path along which it only cuts where the strip is reliably supported by said roller body without interference from and/or clear of the retaining elements.

In a further embodiment the helical cutting path is arranged at an oblique path angle to the neutral plane, wherein the oblique path angle is chosen such that the helical cutting path, along at least one circumferential section of the roller body, extends clear of all retaining elements of the plurality of retaining elements. In other words, it can be prevented that the cutting blade, along the entire helical cutting path, intersects with any one of the retaining elements, with the same advantages as described above.

Preferably, the oblique path angle is between ten and eighty degrees. Cutting along a helical cutting path extending at such an oblique path angle allows for the creation of a relatively sharp leading end and trailing end, which can be conveniently applied to the drum to form a tire component.

In another embodiment the plurality of retaining elements comprise suction openings. The suction openings can be used to retain the strip to the roller body through suction. The roller body is unable to provide a counter surface cooperating with the cutting blade at these suction openings. When cutting across such a suction opening, a part of the strip will be pressed into the suction opening and will not be cut reliably. Hence, by avoiding these suction openings, the strip can be cut reliably while it can also be retained reliably to the roller body during the cutting.

In a preferred embodiment the roller body is annular, wherein the applicator roller further comprises an inner member that is located concentrically within the roller body, wherein the roller body is rotatable about the inner member, wherein the inner member comprises a first chamber and a second chamber arranged sequentially in a circumferential direction about the roller axis, to be in air communication with a first circumferential section and a second circumferential section, respectively, of the roller body. The first chamber and the second chamber can be operationally connected to a source of partial vacuum. Each chamber communicates with the retaining elements within the respective circumferential sections of the roller body as the outer body is rotated about said inner member.

More preferably, the first chamber and the second chamber are separated from each other in the circumferential direction by a first separation wall, wherein the first separation wall extends parallel or substantially parallel to the helical cutting path. When the strip is cut along the helical cutting path, a leading end is created extending at the same oblique path angle as the helical cutting path. Hence, by matching the shape of the chambers, at least at the first separation wall, to the oblique angle of the leading end, the first chamber and the second chamber can effectively retain the strip at the leading end thereof when the leading end is positioned on the roller body near said first separation wall.

Additionally or alternatively, the inner member comprises a third chamber which, together with the first chamber and the second chamber, is arranged sequentially in the circumferential direction, wherein the third chamber is arranged to be in air communication with a third circumferential section of the roller body. The third chamber can also be operationally connected to a source of partial vacuum and communicate with the retaining elements in the respective circumferential section in the same way as the first chamber and the second chamber. Having a third chamber allows for greater flexibility when retaining the strip.

Preferably, the second chamber and the third chamber are separated from each other in the circumferential direction by a second separation wall, wherein the second separation wall extends parallel or substantially parallel to the helical cutting path. Again, by matching the shape of the chambers, at least at the second separation wall, to the oblique angle of the leading end, the second chamber or the third chamber can effectively retain the strip at the leading end thereof when the leading end is positioned on the roller body near said first separation wall.

In a further embodiment the first chamber, the second chamber and the third chamber are individually connectable to a source of compressed air or partial vacuum. Hence, one or more of the chambers can selectively, individually and/or simultaneously generate suction through the suction's openings in the respective circumferential sections of the roller body. Similarly, one or more of the chambers may selectively, individually and/or simultaneously be connected to a source of compressed air to blow-off the strip from the suction's openings in the respective circumferential sections of the roller body.

In one specific embodiment the second chamber is located in a fixed angular position about the roller axis that corresponds to a blow-off position for transferring a leading end of the strip to the drum, wherein the first chamber and the third chamber are located upstream and downstream, respectively, of the second chamber relative to the application direction. Hence, at least the second chamber can be connected to a source of compressed air to effectuate the blow-off of the leading end of the strip from the roller body at said blow-off position. Meanwhile, the first chamber can be used to retain the body of the strip upstream of said leading end prior to and/or during the blow-off of the leading end, or during the subsequent transfer of the body of the strip to the drum. The third chamber can be used to retain the leading end of the strip to the roller body when the strip has been cut and the roller body is still rotating further to apply the trailing end of the cut-off length of the strip to the drum. Once, the trailing end has been applied and/or transferred successfully onto drum, the rotation of the roller body may be reversed to retract the leading end from the third circumferential section back towards the second circumferential section, ready to be blown-off from the roller body during a next application cycle.

In a further embodiment the cutter comprises a cutting blade. The cutting blade, in particular a cutting disc, can be moved along the helical cutting path for cutting the strip.

Preferably, the cutting blade is arranged at a blade angle that is oblique to a neutral plane perpendicular to the roller axis. Hence, the cutting blade can be orientated towards and/or aligned with the helical cutting path.

Alternatively, the cutting blade is arranged at a blade angle to a neutral plane perpendicular to the roller axis, wherein the blade angle is adjustable about an adjustment axis parallel to or in the neutral plane. In contrast, to a fixated position in a fixated holder, where the holder has to be replaced by an alternative holder to adjust the blade angle, in this embodiment the blade angle can be easily adjusted without replacing any parts of the cutter. The blade angle may be adjusted prior to and/or during the cutting.

In another embodiment the applicator unit comprises a rotation drive for rotating the roller body about the roller axis and a lateral drive for generating a relative displacement between the cutting blade and the applicator roller in a lateral direction parallel to the roller axis. The combination of the rotation of the roller body and the relative displacement can result in the cutting blade travelling along the helical cutting path.

Preferably, the lateral drive is configured for displacing the cutting blade across the applicator roller in the lateral direction. Hence, the applicator roller can remain stationary in the lateral direction.

In a further embodiment the applicator unit comprises a control unit that is operationally connected to the rotation drive and the lateral drive for controlling the rotation of the roller body about the roller axis and the relative displacement between the cutting blade and the applicator roller in the lateral direction. The control unit can accurately control and/or at least partially automate the rotation and the relative displacement.

More in particular, the control unit is configured for controlling the rotation of the roller body about the roller axis and the relative displacement between the cutting blade and the applicator roller in the lateral direction such that the cutting blade moves along the helical cutting path. The movement of the cutting blade can thus be accurately controlled and/or at least partially automated.

Additionally or alternatively, the applicator roller comprises a plurality of retaining elements distributed over said roller body, wherein the control unit is configured for determining an angular position of the roller body about the roller axis and for timing the relative displacement between the cutting blade and the applicator roller in the lateral direction based on the angular position of the roller body such that the cutting blade moving along the helical cutting path first intersects with the roller body at a predetermined intersection position relative to said plurality of retaining elements. By knowing of determining the intersection position in advance, said intersection position can be chosen such that the helical cutting path, starting from said predetermined intersection position, extends clear off all retaining elements of the plurality of retaining elements. This has the same technical advantages as described earlier in relation to the retaining elements.

In a further embodiment the control unit is configured for rotating the roller body prior to the relative displacement between the cutting blade and the applicator roller in the lateral direction and for continuing to rotate the roller body during the relative displacement between the cutting blade and the applicator roller in the lateral direction. In contrast to the prior art, the applicator roller according to the present invention can keep rotating, thus preventing excessive stretching of the strip during the cutting.

Preferably, the control unit is configured for rotating the roller body at a constant angular velocity prior to and during the relative displacement between the cutting blade and the applicator roller in the lateral direction. The constant angular velocity may prevent stretching or other excessive deformations of said leading end and trailing end. In other words, the strip can be cut while in motion or 'on-the-fly'.

In another embodiment the blade angle is offset with respect to the helical cutting path over an offset angle within a range of zero to ten degrees. The strip may adhere to the cutting blade during cutting and can unintentionally be pulled along with the cutting blade, causing unexpected deformations in the leading end and/or the trailing end. This may occur when the material of the strip is relatively soft, tacky or thin. By placing the cutting blade at a blade angle that is offset relative to the helical cutting path, the offset will allow the material of the strip to come loose from the cutting blade more easily.

In another embodiment, that can also be applied independently of the applicator roller and the cooperation between the applicator roller and the cutter, the applicator unit further comprises a scraper positioned alongside the cutting blade for scraping off the strip from said cutting blade. The scraper can prevent the strip, which may still be tacky, from sticking to a side of the cutting blade and being pulled along with said cutting blade during the rotation thereof.

According to a second aspect, the invention provides a tire building device comprising the applicator unit according to the first aspect of the invention, wherein the tire building device further comprises a drum, in particular a strip-winding drum, for receiving windings of the strip.

The applicator roller is arranged for applying the leading end of the strip to the drum and to be subsequently moved away from the drum as the rest of the strip is wound in several windings onto said drum. The tire building device further includes the aforementioned applicator unit and thus has the same technical advantages, which will not be repeated hereafter.

In a preferred embodiment the tire building device further comprises one or more stitching rollers arranged downstream of the applicator unit in the application direction. The one or more stitching rollers can stitch the windings of the strip to the drum after the applicator roller has applied the leading end of said strip to said drum.

According to a third aspect, the invention provides a method for applying a strip to a drum with the use of an applicator roller having a roller body that is rotatable about a roller axis, wherein the method comprises the step of:

cutting the strip on the applicator roller along a helical cutting path about said roller axis.

The method according to the third aspect of the invention is not necessarily limited to the features of the applicator unit. It merely requires an applicator roller and the step of cutting the strip on said applicator roller in the aforementioned manner. Still, the method provides the same technical advantages as the applicator unit according to the first aspect of the invention, which advantages will not be repeated hereafter.

Preferably, the applicator roller comprises a plurality of retaining elements distributed over said roller body, wherein the helical cutting path is arranged at an oblique path angle to a neutral plane perpendicular to the roller axis, wherein the oblique path angle is chosen such that the helical cutting path, along at least one circumferential section of the roller body, extends clear of all retaining elements of the plurality of retaining elements.

Additionally or alternatively, the method further comprises the steps of:

- rotating the roller body prior to the step of cutting the strip on the applicator roller along the helical cutting path; and
- continuing to rotate the roller body during the step of cutting the strip on the applicator roller along the helical cutting path.

More in particular, the method further comprises the step of rotating the roller body at a constant angular velocity prior to and during the step of cutting the strip on the applicator roller along the helical cutting path.

According to a fourth aspect, the invention provides a method for applying a strip to a drum with the use of the applicator unit according to the first aspect of the invention, wherein the method comprises the steps of:

- cutting the strip on the applicator roller along the helical cutting path.

The method according to the fourth aspect of the invention incorporates all features of the applicator unit according to the first aspect of the invention and has the same technical advantages, which will not be repeated hereafter.

Preferably, the method comprises the step of generating a relative displacement between the cutting blade and the applicator roller in a lateral direction parallel to the roller axis while at the same time the roller body is rotated about the roller axis such that the cutting blade moves along the helical cutting path.

More preferably, the method comprises the step of displacing the cutting blade across the applicator roller in the lateral direction.

Additionally or alternatively, the applicator roller comprises a plurality of retaining elements distributed over said roller body, wherein the method further comprises the steps of:

- determining an angular position of the roller body about the roller axis; and
- timing the relative displacement between the cutting blade and the applicator roller in the lateral direction based on the angular position of the roller body such that the cutting blade moving along the helical cutting path first intersects with the roller body at a predetermined intersection position relative to said plurality of retaining elements.

Preferably, the helical cutting path, starting from said predetermined intersection position, extends clear off all retaining elements of the plurality of retaining elements.

In another embodiment the roller body is annular, wherein the applicator roller further comprises an inner member that is located concentrically within the roller body, wherein the inner member comprises a first chamber and a second chamber arranged sequentially in a circumferential direction about the roller axis to be in air communication with a first circumferential section and a second circumferential section, respectively, of the roller body, wherein the method further comprises the step of:

- rotating the roller body about the inner member.

Preferably, the inner member comprises a third chamber which, together with the first chamber and the second chamber, is arranged sequentially in the circumferential direction, wherein the third chamber is arranged to be in air communication with a third circumferential section of the roller body, wherein the method further comprises the step of:

- individually connecting the first chamber, the second chamber and the third chamber to a source of compressed air or partial vacuum.

More preferably, the second chamber is located in a fixed angular position about the roller axis that corresponds to a blow-off position for transferring a leading end of the strip to the drum, wherein the first chamber and the third chamber are located upstream and downstream, respectively, of the second chamber relative to the application direction, wherein the method further comprises the steps of:

- connecting at least one of the first chamber and the second chamber to a source of partial vacuum to retain the strip during the step of cutting the strip on the applicator roller along the helical cutting path;

connecting the third chamber to a source of partial vacuum to retain the leading end of the strip after cutting; and disconnecting the third chamber from the source of partial vacuum and connecting the second chamber to a source of compressed air to blow-off the leading end.

Most preferably, the method further comprises the step of reversing the rotation of the roller body prior to the step of disconnecting the third chamber from the source of partial vacuum and connecting the second chamber to a source of compressed air to blow-off the leading end.

The various aspects and features described and shown in the specification can be applied, individually, wherever possible. These individual aspects, in particular the aspects and features described in the attached dependent claims, can be made subject of divisional patent applications.

For example, the applicator roller having an inner member with two or three chambers that are individually connectable to the a source of compressed air or partial vacuum, or a method related to the operation thereof for retaining the leading end and/or the strip body, and for blowing-off said leading end during transfer, may be made subject of divisional patent applications, without the limitations of the applicator unit and/or the cutter moving along the helical cutting path.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
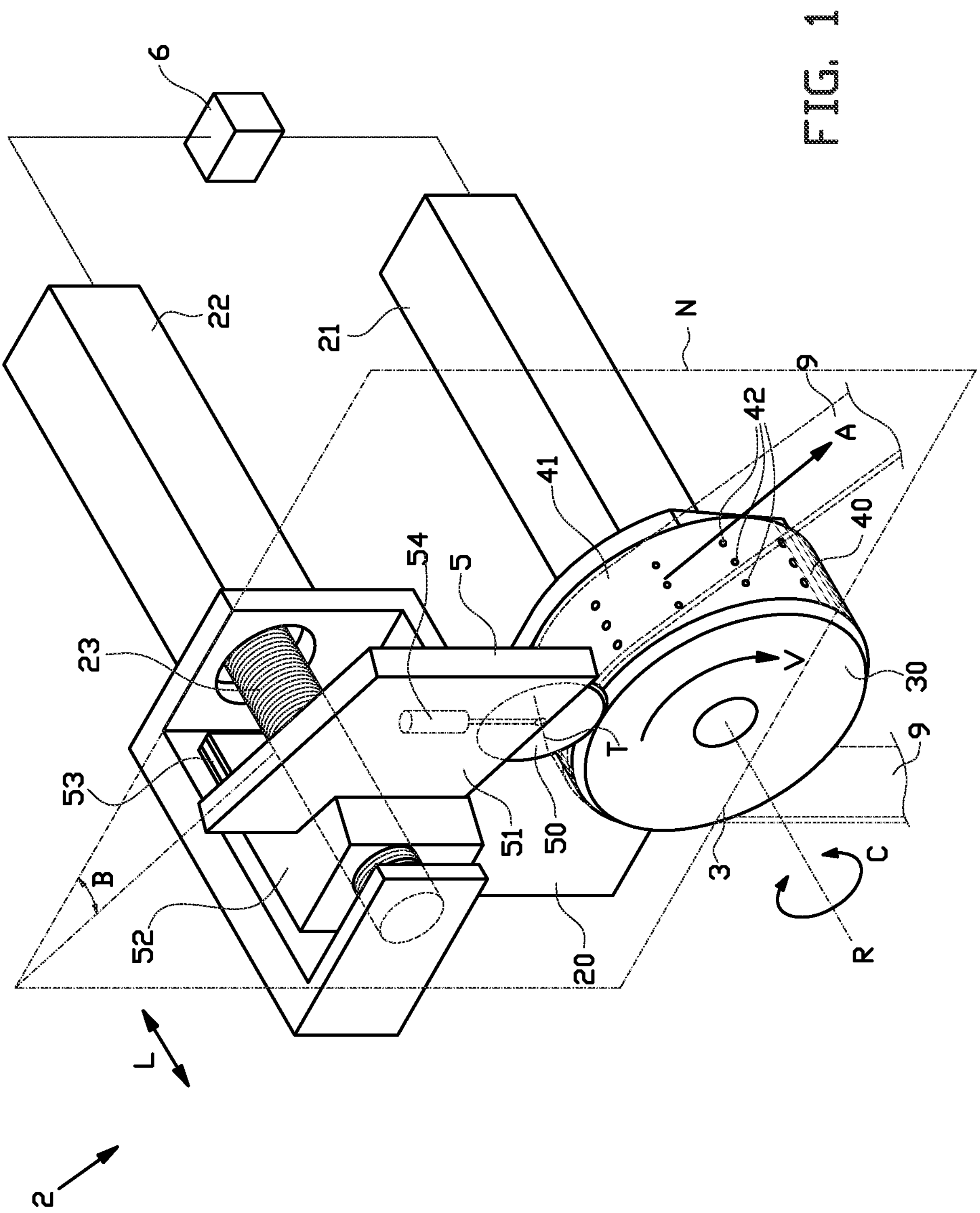
FIG. 1 shows an isometric view of the applicator unit with an applicator roller and a cutter according to a first exemplary embodiment of the invention.

FIGS. 4A-4H show a tire building device 1 for forming a tire component (not shown) on a drum 8, in particular a strip-winding drum. During strip-winding, a continuous length of a strip 9 is wound over a plurality of windings around the drum 8 to form the tire component, i.e. a tread. Typically, the drum 8 is rotatable about a drum axis D and simultaneously traverses parallel to its drum axis D to receive the plurality of windings in a side-by-side relationship.

The tire building device 1 according to the present invention comprises a servicer 10, i.e. a conveyor, for supplying the strip 9 towards the drum 8, an applicator unit 2 for applying the strip 9 to the drum 8 and one or more stitching rollers 7 for stitching the strip 9.

FIG. 1 shows the applicator unit 2 according to a first exemplary embodiment of the invention in more detail. The applicator unit 2 comprises an applicator roller 3 for applying the strip 9 to the drum 8 and a cutter 5 for cutting the strip 9 to length. Preferably, the applicator roller 3 and the cutter 5 are arranged on or mounted to a common structure, frame or base 20. Hence, the applicator unit 2 can be moved as a whole, while the relative positions between the applicator roller 3 and the cutter 5 can be maintained. The applicator roller 3 comprises a roller body 40 that is rotatable about a roller axis R for applying the strip 9 to the drum 8 in an application direction A perpendicular to said roller axis R. The roller body 40 is annular, i.e. ring shaped. The roller body 40 has an outwardly facing circumferential surface 41. The applicator roller 3 further comprises a plurality of retaining elements 42 distributed in a circumferential direction C about the roller axis R over said roller body 40. In this exemplary embodiment, the plurality of retaining elements 42 are formed by vacuum or suction openings. The suction openings are formed as through-holes extending radially through the roller body 40.

Figure 2:
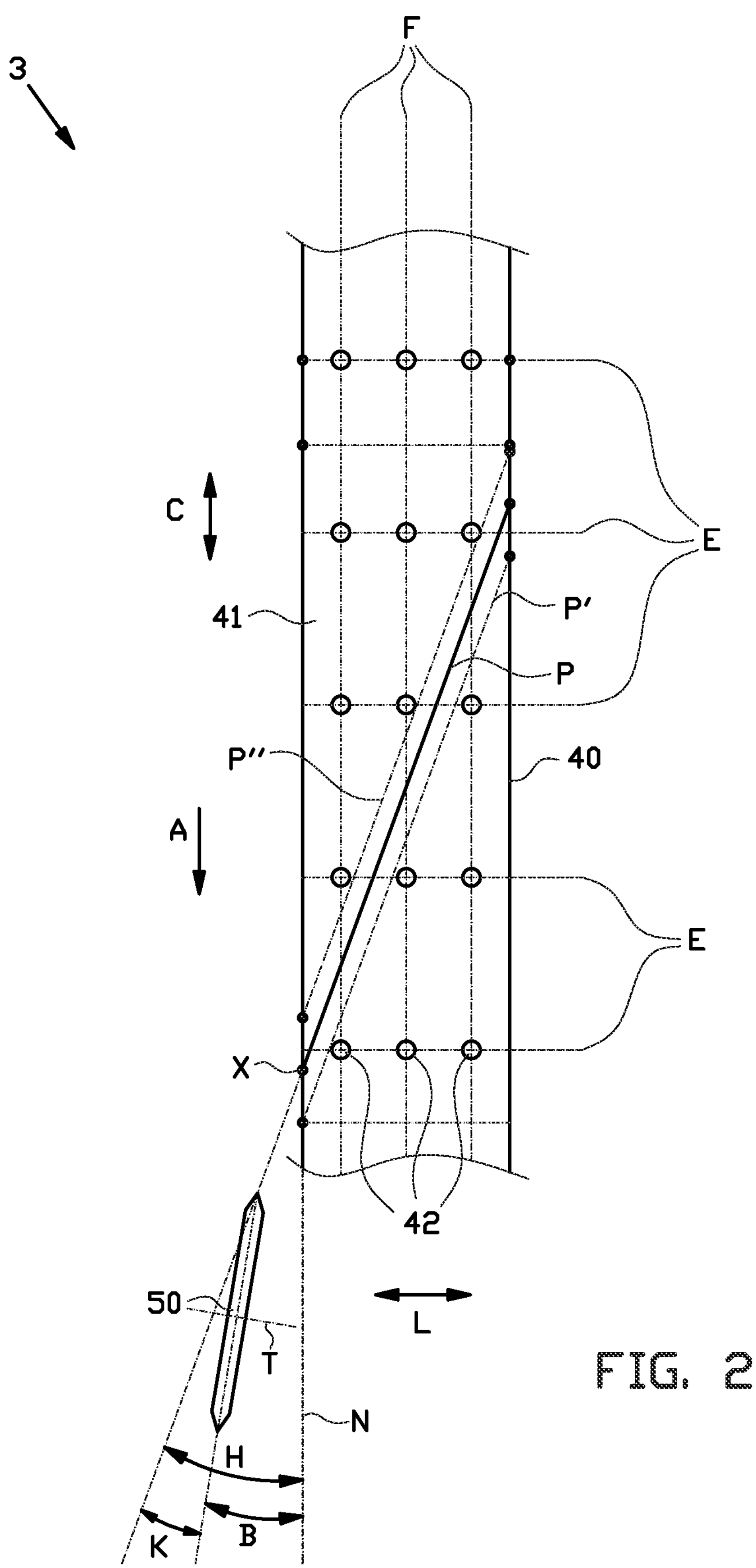
FIG. 2 shows a top view of an unrolled circumferential section of the applicator roller.

As shown in FIG. 2, the plurality of retaining elements 42 are distributed over the roller body 40 according to a pattern E, F. In this example, the pattern comprises a plurality of rows E extending parallel to the roller axis R. The plurality of rows E are mutually spaced apart in a circumferential direction C about said roller axis R. In this particular example, the retaining elements 42 in each of the rows E of the pattern are also arranged in a plurality of columns F in the circumferential direction C to arrive at a matrix-like pattern. Preferably, each row E comprises at least three retaining elements 42 of the plurality of retaining elements 42.

Figure 3:
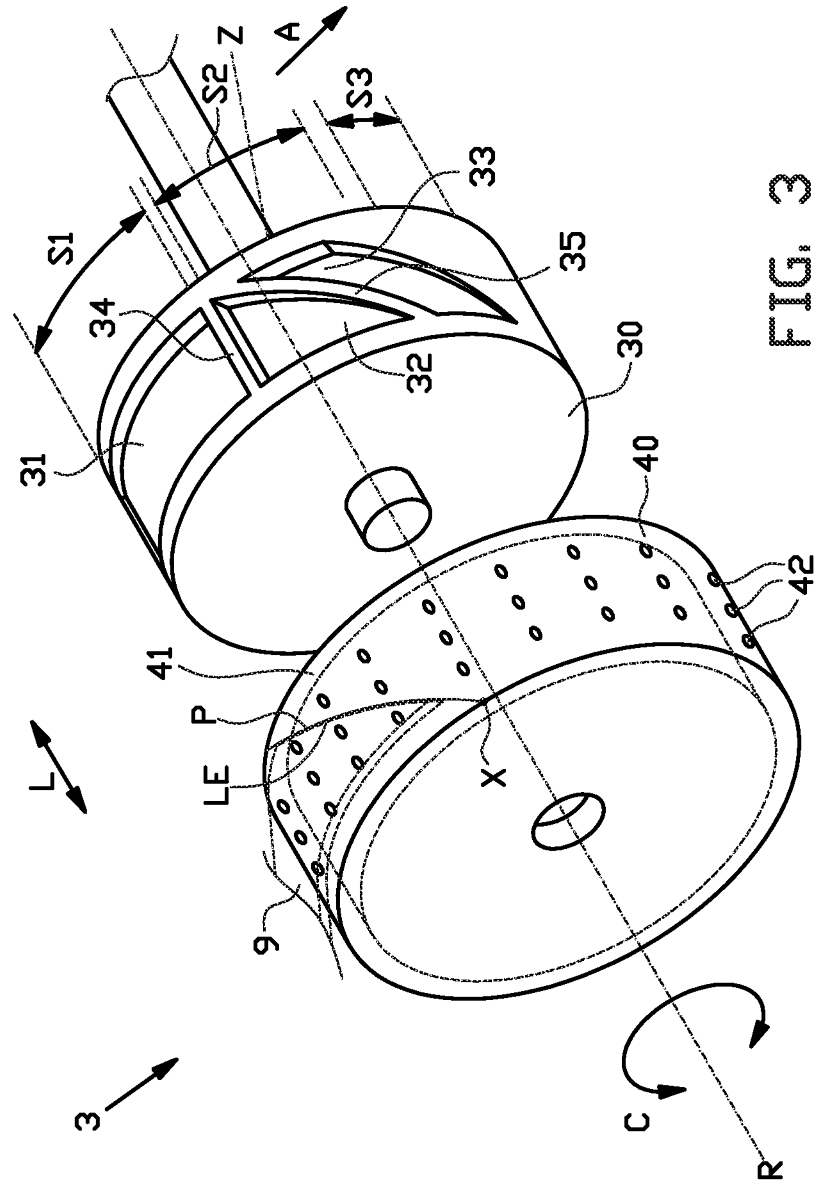
FIG. 3 shows an exploded view of the applicator roller having a roller body and an inner member.

As best seen in FIG. 3, the applicator roller 3 further comprises an inner member 30 that is located concentrically within the roller body 40. The roller body 40 is rotatable about the inner member 30. The roller body 40 is rotatable in both directions, i.e. in the application direction A and in a direction opposite to said application direction A. The inner member 30 preferably remains stationary during the rotation of the roller body 40. In other words, the inner member 30 is in a fixed angular position relative to the roller axis R. Optionally, some means may be provided to adjust or fine-tune the angular position of the inner member 30 about the roller axis R, i.e. with some slots and suitable fasteners. The inner member 30 forms, defines and/or comprises a first chamber 31, a second chamber 32 and a third chamber 33 arranged sequentially in the circumferential direction C which are configured or arranged to be in air communication with a first circumferential section 51 and a second circumferential section S2, respectively, of the roller body 40. The second chamber 32 is located in a fixed angular position about the roller axis R that corresponds to a blow-off position Z for transferring a leading end LE of the strip 9 to the drum 8. The first chamber 31 and the third chamber 33 are located upstream and downstream, respectively, of the second chamber 32 relative to the application direction A.

The first chamber 31 and the second chamber 32 are separated from each other in the circumferential direction C by a first separation wall 34. Similarly, the second chamber 32 and the third chamber 33 are separated from each other in the circumferential direction C by a second separation wall 35.

The first chamber 31, the second chamber 32 and the third chamber 33 are individually connectable to a source of compressed air or partial vacuum. Hence, one or more of the chambers 31-33 can selectively, individually and/or simultaneously generate suction through the suction's openings 42 in the respective circumferential sections S1-S3 of the roller body 40. Similarly, one or more of the chambers 31-33 may selectively, individually and/or simultaneously be connected to a source of compressed air to blow-off the strip 9 from the suction's openings 42 in the respective circumferential sections S1-S3 of the roller body 40.

As shown in FIG. 1, the cutter 5 comprises a cutting blade 50. In this exemplary embodiment, the cutting blade 50 is circular or disc-shaped. The circular disc blade 50 is rotatable about a cutting blade axis T. The cutter 5 further comprises a housing 51 that shields the cutting blade 50 to prevent injuries when the operator is working in close proximity to the cutter. Only the lower part of the cutting blade 50 protrudes out of the housing 51. The cutting blade 50 and/or its housing 51 is mounted on a holder 52. The holder 52 is movable along a guide rail 53 in a lateral direction L parallel to the roller axis R, thereby allowing the cutting blade 50 to move relative to and/or across the applicator roller 3 in said lateral direction L.

The holder 52 is designed to hold the cutting blade 50 at a blade angle B that preferably is non-right or oblique relative to a neutral plane N extending radially or perpendicular to the roller axis R. In the context of the present invention, the 'blade angle' B is the angle between main surface or the main plane in which the cutting blade B extends and the neutral plane N. Alternatively formulated, the blade angle B may correspond to the angle between the cutting blade axis T and the roller axis R.

The blade angle B may be chosen such that the cutting blade 50 extends at the side of the neutral plane N as shown in FIG. 1, or alternatively at the opposite side of the neutral plane N, i.e. to change the orientation of the leading end LE and the trailing end TE.

Figure 5:
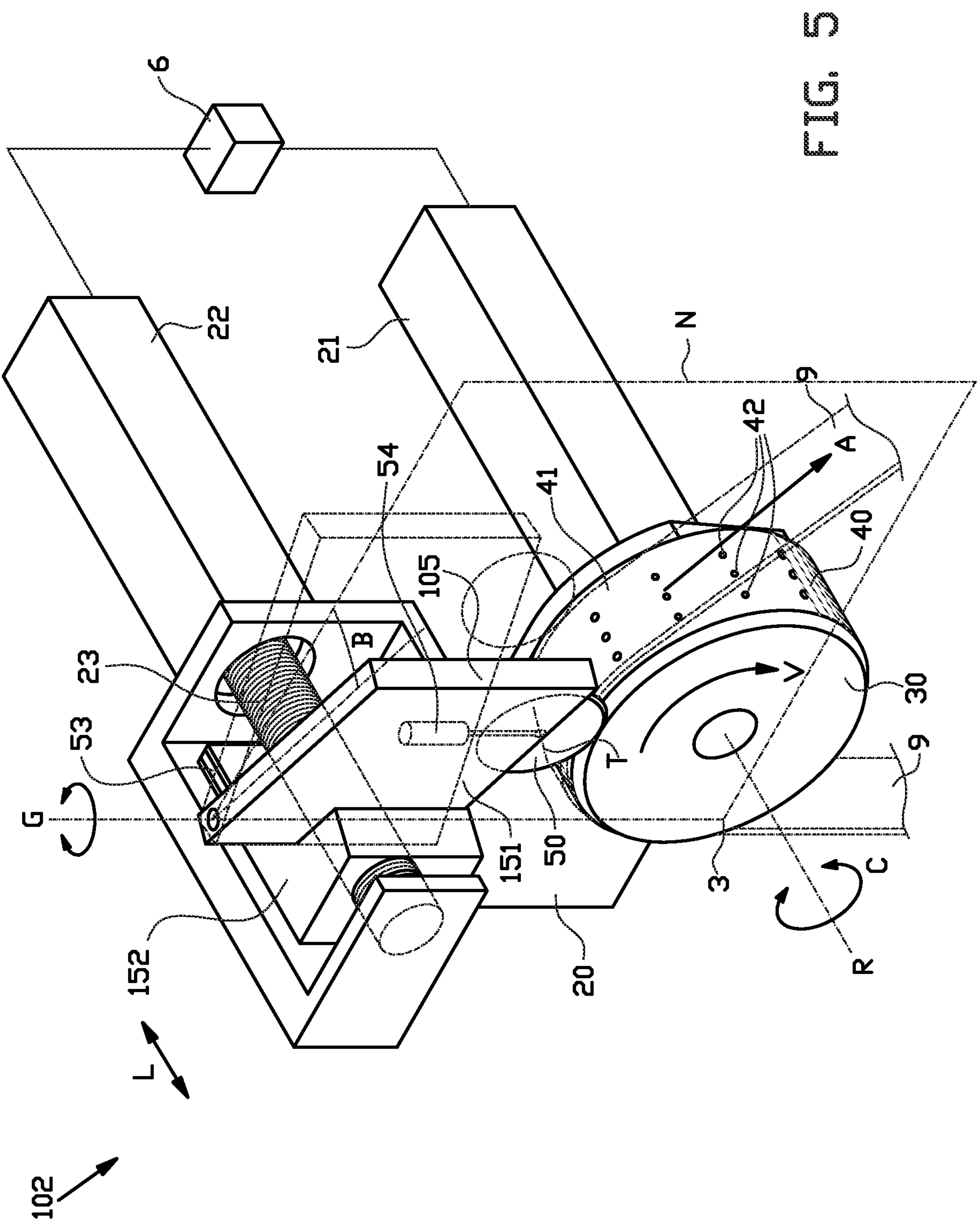
FIG. 5 shows an isometric view of an alternative applicator unit with an applicator roller and a cutter according to a second exemplary embodiment of the invention.

In this exemplary embodiment, the holder 52 is formed as a rigid block with no means to adapt the blade angle B other than replacing the holder 52 with an alternative holder. It is however envisioned that the holder 52 may alternatively be configured for adjusting the blade angle B, i.e. by manually adjustable, mechanical means or via a remotely controlled actuator (not shown). For example, FIG. 5 shows an alternative applicator unit 102 according to a second exemplary embodiment of the invention that differs from the previously discussed applicator unit 2 in that the blade angle B of the cutting blade 50 is adjustable relative to the holder 152 about an adjustment axis G. In particular, the cutter 105 comprises a housing 151 that is hingeably connected to said holder 152 about an adjustment axis G to set the blade angle B of the cutting blade 50 between the position as shown in solid lines and an opposite position shown in dashed lines.

The cutter 5 further comprises a cutting height adjustment member 54 to adjust the height of the cutting blade 50 relative to the applicator roller 3. The cutting height adjustment member 54 may also allow the cutting blade 50 follow height variations in the circumferential surface 41 of the roller body 40, i.e. when said circumferential surface 41 is slightly crowned. The cutting height adjustment member 54 may for example be a pneumatic cylinder that can be compressed slightly when the cutting blade 50 moves across the circumferential surface 41 in the lateral direction L.

As shown in FIG. 1, the applicator unit 2 further comprises a rotation drive 21 for rotating the roller body 40 about the roller axis R and a linear or lateral drive 22 for generating a relative displacement between the cutting blade 50 and the applicator roller 3 in the lateral direction L. In this exemplary embodiment, the lateral drive 22 is configured for displacing the cutting blade 50 across the applicator roller 3 in the lateral direction L. In particular, the lateral drive 22 engages directly onto and/or drives the holder 52. The lateral drive 22 may comprise a spindle 23 that can convert a rotation into a linear motion of the cutting blade 50 in or parallel to the lateral direction L.

Alternatively, the lateral drive may be arranged to displace the applicator roller 3 relative to the cutting blade 50 in the lateral direction L.

As schematically shown in FIG. 1, the applicator unit 2 further comprises a control unit 6 that is electronically and/or operationally connected to the rotation drive 21 and the lateral drive 22. The control unit 6 is adapted, configured, programmed and/or arranged for controlling the rotation of the roller body 40 about the roller axis R and the relative displacement between the cutting blade 50 and the applicator roller 3 in the lateral direction L. When controlling the both the rotation of the roller body 40 and the relative displacement between the cutting blade 50 and the applicator roller 3 simultaneously, the control unit 6 can make the cutting blade 50 move across the circumferential surface 41 of the roller body 40 along a helical cutting path P about the roller axis R, as shown in FIGS. 2 and 3.

As best seen in FIG. 2, the helical cutting path P is arranged at an oblique path angle H to the neutral plane N. The oblique path angle H is preferably chosen in a range between ten and eighty degrees.

When cutting through the strip 9 along the helical cutting path P, the strip 9 may adhere to the cutting blade 50 during cutting and can unintentionally be pulled along with the cutting blade 50. This may occur when the material of the strip 9 is relatively soft, tacky or thin. To prevent this phenomenon, the blade angle B may intentionally be offset relative to the helical cutting path P over a relatively small offset angle K. The offset angle K is preferably within a range of zero to ten degrees. The offset angle K will allow the material of the strip 9 to come loose from the cutting blade 50 more easily during the cutting.

It is conceivable, when the oblique path angle H is very small or very large, i.e. close to ten degrees or close to eighty degrees, the offset may result in the cutting blade 50 extending at a blade angle B of zero or ninety degrees to the neutral plane N. Hence, the cutting blade 50 may be parallel to the neutral plane N or perpendicular to said neutral plane N, while still moving along the helical cutting path P.

Alternatively, the blade angle B and the oblique path angle H may be the same, i.e. the cutting blade 50 may be aligned with the helical cutting path P.

As shown in FIG. 2, the helical cutting path P starts at an intersection position X where the cutting blade 50 first intersects with the roller body 40 of the applicator roller 3. The control unit 6 is configured for determining an angular position of the roller body 40 about the roller axis R, i.e. by using calibration and/or position data from the rotation drive 21 or by using an encoder (not shown). The control unit 6 can use this information to predict and/or predetermine where the intersection point X will be on the circumference of the roller body 40 for a specific start time of the relative displacement between the cutting blade 50 and the applicator roller 3 in the lateral direction L. In other words, the control unit 6 can time the relative displacement in the lateral direction L to control the intersection position X to be at a predetermined location on the circumference of the roller body 40. In addition, when the blade angle B is adjustable, said blade angle B may be set prior to and/or varied during the cutting.

In particular, the control unit 6 may time the relative displacement in the lateral direction L relative to the plurality of retaining elements 42 such that the helical cutting path P, starting from said predetermined intersection position X, extends clear off all retaining elements 42 of the plurality of retaining elements 42 that are in close proximity to the helical cutting path P or all retaining elements 42 of the plurality of retaining elements 42 that are located within a circumferential section of the roller body 41 through which the helical cutting path P extends.

As shown in FIG. 2, the helical cutting path P extends through four rows E of the plurality of rows E while extending clear of the plurality of retaining elements 42 in said four rows E. It will be appreciated by one skilled in the art that there may be a small tolerance in the timing which would result in alternative helical cutting paths P', P" that would still extend clear of the retaining elements 42 in the respective rows E. Also, the oblique path angle H may differ slightly within the aforementioned tolerance without the helical cutting path P intersecting with any one of the retaining elements 42.

As shown in FIG. 3, the first separation wall 34 extends parallel or substantially parallel to the roller axis R and the second separation wall 35 extends parallel or substantially parallel to the helical cutting path P.

A method for applying the strip 9 to the drum 8 with the use of the aforementioned tire building device 1, and in particular the applicator unit 2 thereof, will be described hereafter with reference to FIGS. 4A-4H.

Figures 4A, 4B, 4C, 4D:
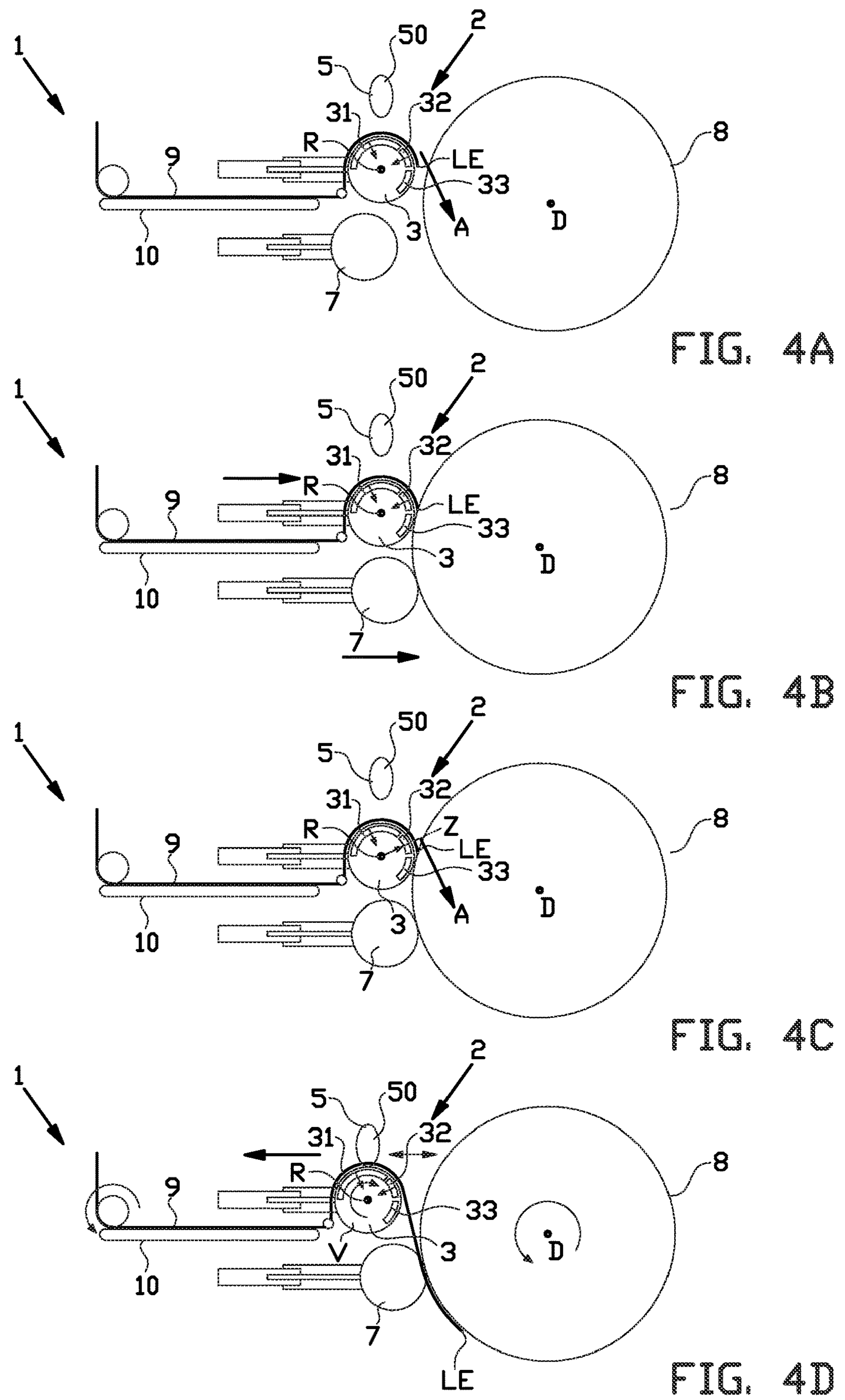
FIGS. 4A-4H show side views of a tire building device comprising the applicator unit according to FIG. 1, during the steps of a method for applying a strip to a drum.

FIG. 4A shows the situation in which the strip 9 is supplied by the servicer 10 to the applicator unit 2. The cutting blade 50 is retracted into a standby position at the side of and/or above the applicator roller 3. The leading end LE has been created by cutting off a previous length of the strip 9 (not shown) during a previous cycle of the method. Alternatively, the leading end LE may be created by cutting-off a waste length of an entirely new strip 9 at the start of the first cycle of the method. The leading end LE is positioned on the applicator roller 3 overhead or lying on the circumferential sections associated with the first chamber 31 and the second chamber 32. The first chamber 31 and the second chamber 32 are connected to a source of partial vacuum to retain the leading end LE and the body of the strip 8 upstream of said leading end LE, i.e. at the location of said first chamber 31 and said second chamber 32, through suction. The third chamber 33 is not pressurized or 'idle' to prevent air leakage through the suction openings not covered by the strip 9. The drum 8 is empty and ready to receive windings of the strip 9.

FIG. 4B shows the situation in which the applicator unit 2 is moved towards the drum 1 to apply the leading end LE onto the circumferential surface of the drum 8. The first chamber 31 and the second chamber 32 remain under a partial vacuum. In this example, the stitcher roller 7 is moved towards the drum 8 at the same time. Alternatively, the stitcher roller 7 may be moved towards the drum 8 after the leading end LE has been applied.

FIG. 4C shows the situation in which the second chamber 32 is switched or disconnected from the source of partial vacuum and is instead connected to a source of compressed air. In other words, the second chamber 32 is pressurized with a pressure greater than the ambient pressure. The suction openings in the roller body of the applicator roller 3 which are in communication with the second chamber 32 can now effectively blow-off the leading end LE, thereby transferring said leading end LE from the applicator roller 3 onto the drum 8.

FIG. 4D shows the situation in which the roller body of the applicator roller 3 is rotated at an angular velocity V about the roller axis R to advance and/or transfer the leading end LE of the strip 9 towards the drum 8 in the application direction A. The drum 8 is rotated to receive the strip 9 as it is transferred onto the drum 8 by the applicator roller 3. Once the leading end LE has moved away from the applicator roller 3, the second chamber 32 may be connected to the source of partial vacuum again for together with the first chamber 31 retaining the strip body to the applicator roller 3 along the circumferential sections of associated with said chambers 31, 32. Because the leading end LE has been applied and transferred, the applicator unit 2 may now be retracted in a direction away from the drum 8 so as not to interfere with the operation of the stitching roller 7.

Note that in FIG. 4D, the cutting blade 50 may be brought into an active position alongside and/or at the level of the circumferential surface of the applicator roller 3, ready for cutting.

Figures 4E, 4F, 4G, 4H:
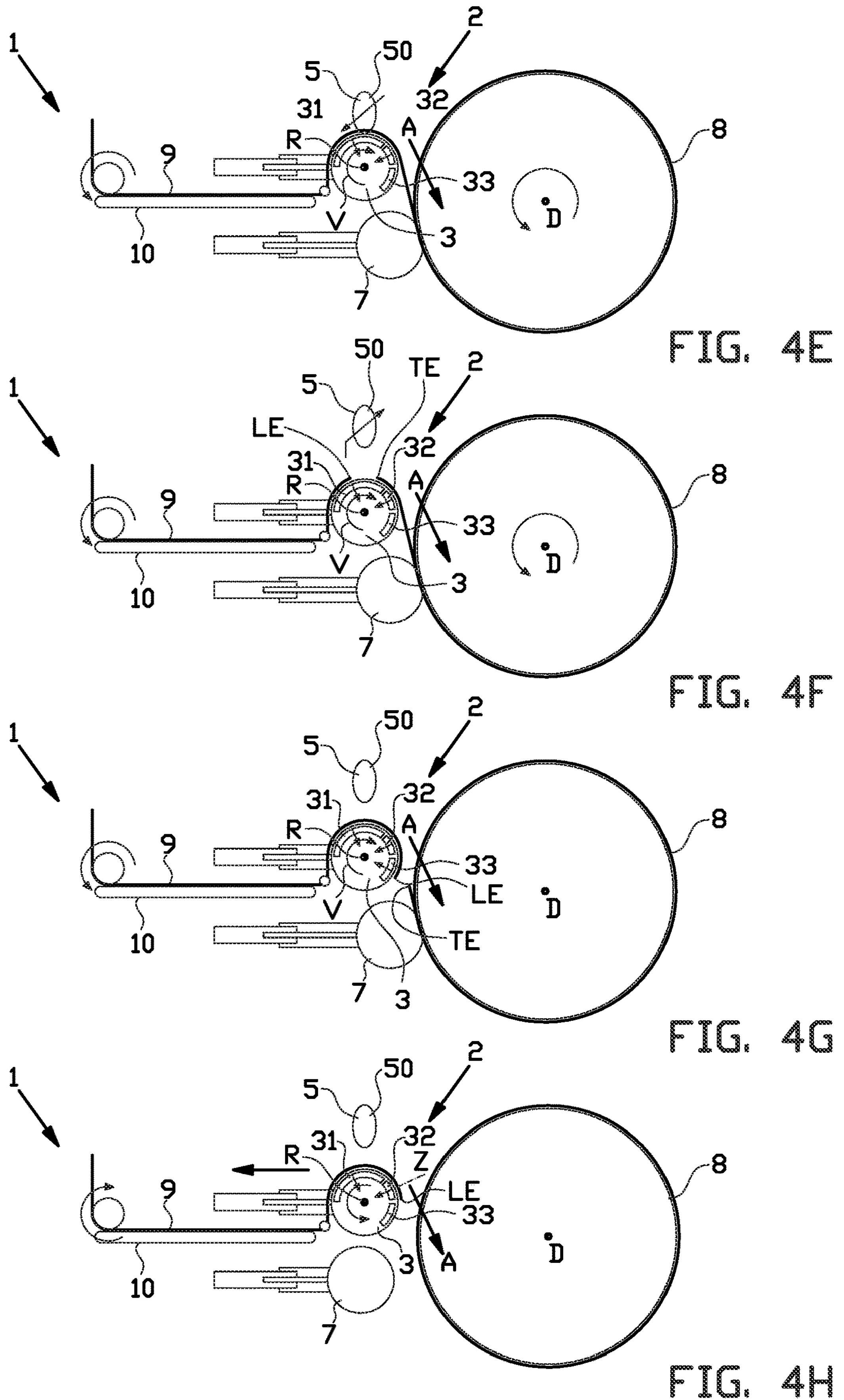

FIG. 4E shows the situation in which the drum 8 has been rotated further to take on several or a plurality of windings of the strip 9, i.e. to form one or more layers of a tire component (not shown). The applicator roller 3 keeps rotating in the same direction, preferably with the same or a constant angular velocity V. When the tire component has nearly been completed and the last winding is to be applied to the drum 8, the applicator roller 3 and the cutter 5 are simultaneously controlled to move along the helical cutting path, as shown in FIG. 2, in the aforementioned manner. Prior to the cutting, the method may further comprise the steps of determining the angular position of the roller body about the roller axis R; and timing the previously described relative displacement to control the intersection position X of the helical cutting path P. The first chamber 31 and the second chamber 32 remain connected to the source of partial vacuum to reliably retain the strip 9 to the circumferential surface of the applicator roller 3 during the cutting.

FIG. 4F shows the situation when the cutter 5 has completed the cut and the cutting blade 50 is moved away from the circumferential surface of the applicator roller 3. In this example, the cutting blade 50 is lifted from the applicator roller 3 and returned above the applicator roller 3 to its standby position. The cut has generated a new leading end LE and trailing end TE in the strip 9. The trailing end TE is part of the cut-off length of the strip 9 that has yet to be transferred onto the drum 8 as part of the final winding to complete the tire component. The new leading end LE is ready at the applicator roller 3 for a next cycle of the method. The first chamber 31 and the second chamber 32 remain connected to the source of partial vacuum to retain the new leading end LE.

FIG. 4G shows the situation in which applicator roller 3 is rotated further in the same direction, preferably at the same or a constant angular velocity V to supply the trailing end TE of the cut-off length of the strip 9 towards the drum 8. As a result of said further rotation, the new leading end LE of the strip 9 becomes situated overhead or along the circumferential section of the roller body of the applicator roller 3 that is associated with the third chamber 33. The third chamber 33 is now also connected to the source of partial vacuum to retain the leading end LE of the strip 9 to effectively the applicator roller 3 at the location of the third chamber 33.

FIG. 4H shows the situation in which the rotation of the roller body of the applicator roller 3 is reversed to retract the new leading end LE towards the blow-off position Z, i.e. into a position in which the new leading end LE is located overhead or along the circumferential section associated with the second chamber 32. The third chamber 33 may now be disconnected again from the source of partial vacuum. The winding on the drum 8 has been completed. Consequently, the stitcher roller 7 may be retracted.

Note that the situation of FIG. 4H corresponds to the situation of FIG. 4A. When the tire component is removed from the drum 8, a new cycle of the method may commence.

During the steps as shown in FIGS. 4D, 4E and 4F, the roller body of the applicator roller 3 may be rotated continuously in the same direction and/or with a constant or substantially constant angular velocity V, thereby allowing the applicator unit 2 to cut the strip 9 while in motion or 'on-the-fly'. This may prevent stretching or other excessive deformations of said leading end LE and trailing end TE prior to, during or after the cutting.

Figures 6A, 6B:
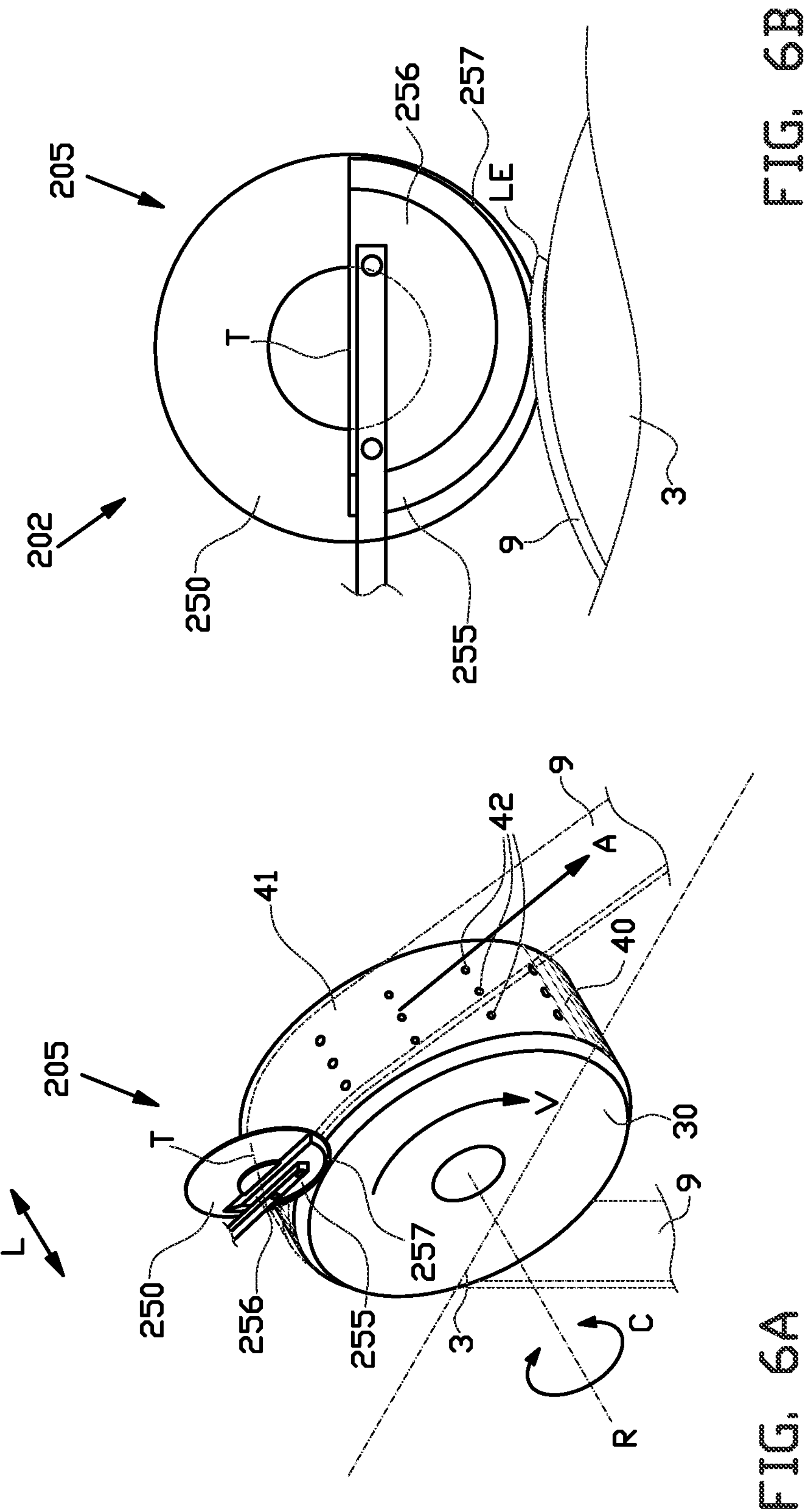
FIGS. 6A and 6B show an isometric view and a side view, respectively, of a further alternative applicator unit with an applicator roller, a cutter and a scraper according to a third exemplary embodiment of the invention.

FIGS. 6A and 6B show a further alternative applicator unit 202 that differs from the aforementioned applicator units 2, 102 in that the applicator unit 202 further comprises a scraper 255 at one lateral side of the cutting blade 250 in an axial direction along the cutting blade axis T. The scraper 255 is positioned along the cutting blade 250 to prevent that the strip 9, which may still be tacky, sticks to a side of the cutting blade 250 and is pulled along with said cutting blade 250 during the rotation thereof. In particular, the scraper 255 is positioned at the side of the cutting blade 250 where the cutting blade 250 first cuts into the strip 9 such that the tip of the leading end LE that is initially formed is scraped off from the cutting blade 250 and remains on the applicator roller 3. As best seen in FIG. 6B, the scraper 255 is provided with an at least partially circular scraping body 256 that forms an at least partially circular scraping edge 257 facing towards applicator roller 3. In this example, the at least partially circular scraping edge 257 extends eccentrically with respect to the cutting blade axis T, favoring the position where the tip of the leading end TE tends to be pulled upward along the cutting blade 250.

As shown in FIG. 6A, to position the scraper 255 as close as possible to the cutting blade 250, the cutting blade 250 is of the single bevel type, with the bevel at the side of the cutting blade 250 facing away from the scraper 255, in contrast to the double beveled or V-shaped cutting blade 50 of FIG. 2. Hence, the scraper 255 can be positioned as close as possible to the flat side of the cutting blade 250.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. An applicator unit for applying a strip to a drum, the applicator unit comprising:
- an applicator roller; and
- a cutter,
- wherein the cutter comprises a cutting blade,
- wherein the applicator roller comprises a roller body that is rotatable about a roller axis for applying the strip to the drum in an application direction perpendicular to said roller axis,
- wherein the applicator roller and the cutter are configured to cooperate for cutting the strip on the applicator roller along a helical cutting path about the roller axis,
- wherein the applicator unit comprises
  - a rotation drive for rotating the roller body about the roller axis,
  - a lateral drive for generating a relative displacement between the cutting blade and the applicator roller in a lateral direction parallel to the roller axis, and
  - a control unit that is operationally connected to the rotation drive and the lateral drive for controlling the rotation of the roller body about the roller axis and the relative displacement between the cutting blade and the applicator roller in the lateral direction,
  - wherein the control unit is configured for controlling both the rotation of the roller body about the roller axis and the relative displacement between the cutting blade and the applicator roller in the lateral direction simultaneously such that the cutting blade moves along the helical cutting path.

2. The applicator unit according to claim 1, wherein the applicator roller comprises a plurality of retaining elements distributed over said roller body.

3. The applicator unit according to claim 2, wherein the plurality of retaining elements is distributed over said roller body according to a pattern.

4. The applicator unit according to claim 3, wherein the pattern comprises a plurality of rows extending parallel to the roller axis and mutually spaced apart in a circumferential direction about said roller axis.

5. The applicator unit according to claim 4, wherein the helical cutting path extends through two or more rows of the plurality of rows while extending clear of the plurality of retaining elements in said two or more rows.

6. The applicator unit according to claim 2, wherein the helical cutting path is arranged at an oblique path angle to a neutral plane perpendicular to the roller axis,
- wherein the oblique path angle is chosen such that the helical cutting path, along at least one circumferential section of the roller body, extends clear of all retaining elements of the plurality of retaining elements.

7. The applicator unit according to claim 6, wherein the oblique path angle is between ten and eighty degrees.

8. The applicator unit according to claim 2, wherein the plurality of retaining elements comprise suction openings.

9. The applicator unit according to claim 8, wherein the roller body is annular,
- wherein the applicator roller further comprises an inner member that is located concentrically within the roller body, wherein the roller body is rotatable about the inner member,
- wherein the inner member comprises a first chamber and a second chamber arranged sequentially in a circumferential direction about the roller axis, to be in air communication with a first circumferential section and a second circumferential section, respectively, of the roller body.

10. The applicator unit according to claim 9, wherein the first chamber and the second chamber are separated from each other in the circumferential direction by a first separation wall,
- wherein the first separation wall extends parallel to the roller axis.

11. The applicator unit according to claim 9, wherein the inner member comprises a third chamber which, together with the first chamber and the second chamber, is arranged sequentially in the circumferential direction,
- wherein the third chamber is arranged to be in air communication with a third circumferential section of the roller body.

12. The applicator unit according to claim 11, wherein the second chamber and the third chamber are separated from each other in the circumferential direction by a second separation wall, wherein the second separation wall extends parallel to the helical cutting path.

13. The applicator unit according to claim 11, wherein the first chamber, the second chamber and the third chamber are individually connectable to a source of compressed air or a source of partial vacuum.

14. The applicator unit according to claim 11, wherein the second chamber is located in a fixed angular position about the roller axis that corresponds to a blow-off position for transferring a leading end of the strip to the drum, wherein the first chamber and the third chamber are located upstream and downstream, respectively, of the second chamber relative to the application direction.

15. The applicator unit according to claim 1, wherein the cutting blade is arranged at a blade angle that is oblique to a neutral plane perpendicular to the roller axis.

16. The applicator unit according to claim 15, wherein the cutting blade is arranged at a blade angle that is oblique to a neutral plane perpendicular to the roller axis, wherein the blade angle is adjustable about an adjustment axis parallel to or in the neutral plane.

17. The applicator unit according to claim 1, wherein the lateral drive is configured for displacing the cutting blade across the applicator roller in the lateral direction.

18. The applicator unit according to claim 1, wherein the applicator roller comprises a plurality of retaining elements distributed over said roller body, wherein the control unit is configured for determining an angular position of the roller body about the roller axis and for timing the relative displacement between the cutting blade and the applicator roller in the lateral direction based on the angular position of the roller body such that the cutting blade moving along the helical cutting path first intersects with the roller body at a predetermined intersection position relative to said plurality of retaining elements.

19. The applicator unit according to claim 18, wherein the helical cutting path, starting from said predetermined intersection position, extends clear off all retaining elements of the plurality of retaining elements.

20. The applicator unit according to claim 1, wherein the control unit is configured for rotating the roller body prior to the relative displacement between the cutting blade and the applicator roller in the lateral direction and for continuing to rotate the roller body during the relative displacement between the cutting blade and the applicator roller in the lateral direction.

21. The applicator unit according to claim 20, wherein the control unit is configured for rotating the roller body at a constant angular velocity prior to and during the relative displacement between the cutting blade and the applicator roller in the lateral direction.

22. The applicator unit according to claim 15, wherein the blade angle is offset with respect to the helical cutting path over an offset angle within a range of zero to ten degrees.

23. A tire building device comprising the applicator unit according to claim 1, wherein the tire building device further comprises a drum for receiving windings of the strip.

24. The method for applying a strip to a drum with the use of an applicator unit according to claim 1, wherein the method comprises the steps of:

cutting the strip on the applicator roller along the helical cutting path.

25. The method according to claim 24, wherein the method comprises the step of generating the relative displacement between the cutting blade and the applicator roller in the lateral direction parallel to the roller axis while at the same time the roller body is rotated about the roller axis such that the cutting blade moves along the helical cutting path.

26. The method according to claim 25, wherein the method comprises the step of displacing the cutting blade across the applicator roller in the lateral direction.

27. The method according to claim 25, wherein the applicator roller comprises a plurality of retaining elements distributed over said roller body, wherein the method further comprises the steps of:

determining an angular position of the roller body about the roller axis; and timing the relative displacement between the cutting blade and the applicator roller in the lateral direction based on the angular position of the roller body such that the cutting blade moving along the helical cutting path first intersects with the roller body at a predetermined intersection position relative to said plurality of retaining elements.

28. The method according to claim 27, wherein the helical cutting path, starting from said predetermined intersection position, extends clear off all retaining elements of the plurality of retaining elements.

29. The method according to claim 24, wherein the roller body is annular, wherein the applicator roller further comprises an inner member that is located concentrically within the roller body, wherein the inner member comprises a first chamber and a second chamber arranged sequentially in a circumferential direction about the roller axis to be in air communication with a first circumferential section and a second circumferential section, respectively, of the roller body, wherein the method further comprises the step of:

rotating the roller body about the inner member.

30. The method according to claim 29, wherein the inner member comprises a third chamber which, together with the first chamber and the second chamber, is arranged sequentially in the circumferential direction, wherein the third chamber is arranged to be in air communication with a third circumferential section of the roller body, wherein the method further comprises the step of: individually connecting the first chamber, the second chamber and the third chamber to a source of compressed air or a source of partial vacuum.

31. The method according to claim 30, wherein the second chamber is located in a fixed angular position about the roller axis that corresponds to a blow-off position for transferring a leading end of the strip to the drum, wherein the first chamber and the third chamber are located upstream and downstream, respectively, of the second chamber relative to the application direction, wherein the method further comprises the steps of: connecting at least one of the first chamber and the second chamber to the source of partial vacuum to retain the strip during the step of cutting the strip on the applicator roller along the helical cutting path; connecting the third chamber to the source of partial vacuum to retain the leading end of the strip after cutting; and disconnecting the third chamber from the source of partial vacuum and connecting the second chamber to the source of compressed air to blow-off the leading end.

32. The method according to claim 31, wherein the method further comprises the step of reversing the rotation of the roller body prior to the step of disconnecting the third chamber from the source of partial vacuum and connecting the second chamber to the source of compressed air to blow-off the leading end.

* * * * *